US009961839B2

(12) United States Patent
Stones (10) Patent No.: US 9,961,839 B2
(45) Date of Patent: May 8, 2018

(54) VEGETATION CUTTING DEVICE

(71) Applicant: BLACK & DECKER INC., Newark, DE (US)

(72) Inventor: Kevin Stones, Durham (GB)

(73) Assignee: BLACK & DECKER INC., New Britain, CT (US)

( * ) Notice: Subject to any disclaimer, the term of this patent is extended or adjusted under 35 U.S.C. 154(b) by 80 days.

(21) Appl. No.: 14/794,124

(22) Filed: Jul. 8, 2015

(65) Prior Publication Data

US 2016/0007542 A1 Jan. 14, 2016

(30) Foreign Application Priority Data

Jul. 14, 2014 (EP) .................................... 14176655

(51) Int. Cl.
*A01G 3/053* (2006.01)

(52) U.S. Cl.
CPC .................................... *A01G 3/053* (2013.01)

(58) Field of Classification Search
CPC .............................. A01G 3/0475; A01G 3/053
USPC ................................................... 30/208–220
See application file for complete search history.

(56) References Cited

U.S. PATENT DOCUMENTS

| | | | | |
|---|---|---|---|---|
| 3,646,675 A * | 3/1972 | Wezel | ...................... | B26B 7/005 30/217 |
| 3,962,924 A | 6/1976 | Glover et al. | | |
| 4,592,142 A * | 6/1986 | Schnizler | ............... | A01G 3/053 30/210 |
| 4,868,988 A * | 9/1989 | Han | ........................ | B26B 19/06 30/210 |
| 5,075,972 A * | 12/1991 | Huang | .................... | A01G 3/053 30/216 |
| 5,079,841 A * | 1/1992 | Ohkanda | ................. | A01G 3/053 30/216 |
| 5,373,641 A * | 12/1994 | Ohkanda | ................. | A01G 3/053 30/216 |
| H001428 H * | 4/1995 | Ohkanda | ................. | A01G 3/053 30/210 |
| 5,426,856 A * | 6/1995 | Aiyama | .................. | A01G 3/053 30/208 |
| 5,689,887 A * | 11/1997 | Heywood | .............. | A01G 3/053 30/216 |

(Continued)

FOREIGN PATENT DOCUMENTS

| | | |
|---|---|---|
| EP | 1025924 A1 | 8/2000 |
| EP | 2266389 | 12/2010 |

(Continued)

OTHER PUBLICATIONS

EP search report dated Jan. 15, 2008.

*Primary Examiner* — Jason Daniel Prone
(74) *Attorney, Agent, or Firm* — John Yun (57) ABSTRACT

A vegetation cutting device having a housing and a motor mounted in the housing to drive a drive gear. A rotatable eccentric cam mounted on the drive gear. A reciprocating blade assembly having a first blade and a second blade, wherein the first blade is coupled to the rotatable eccentric cam and is arranged to reciprocally move when driven by the rotatable eccentric cam. A cam adjustment mechanism for varying the eccentricity of the rotatable eccentric cam with respect to the drive gear to thereby vary the distance through which the first blade moves.

14 Claims, 10 Drawing Sheets

(56) References Cited

U.S. PATENT DOCUMENTS

| | | | |
|---|---|---|---|
| 7,360,311 B2* | 4/2008 | Stones | A01G 3/053 30/210 |
| 7,406,770 B2* | 8/2008 | Mace | A01D 34/14 30/216 |
| 9,241,444 B2* | 1/2016 | Barker | A01G 3/053 30/216 |
| 9,603,311 B2* | 3/2017 | Wang | A01G 3/053 30/216 |
| 2008/0134521 A1 | 6/2008 | Hanada | |
| 2009/0145096 A1 | 6/2009 | Pripeke | |
| 2011/0179651 A1 | 7/2011 | Hittmann | |
| 2013/0025135 A1* | 1/2013 | Gejervall | A01G 3/053 30/216 |
| 2015/0223401 A1* | 8/2015 | Schiedt | A01G 3/053 30/216 |
| 2016/0113209 A1* | 4/2016 | Sergyeyenko | A01G 3/053 30/216 |
| 2016/0330914 A1* | 11/2016 | Tang | A01G 3/053 30/216 |

FOREIGN PATENT DOCUMENTS

| | | | | |
|---|---|---|---|---|
| EP | 2281440 A1 | | 2/2011 | |
| EP | 2965616 A1 | * | 1/2016 | A01G 3/053 |

* cited by examiner

VEGETATION CUTTING DEVICE

CROSS-REFERENCE TO RELATED APPLICATIONS

This application claims priority to European Patent Application No. 14176655.0 filed Jul. 11, 2014. The entire contents of that application are expressly incorporated herein by reference.

FIELD OF THE INVENTION

The present invention relates to a vegetation cutting device. In particular the present invention relates to a hedge trimmer.

BACKGROUND OF THE INVENTION

Vegetation cutting devices such as hedge trimmers are known power operated tools for cutting hedges and other foliage and vegetation. Typically hedge trimmers are powered by petrol or electric and an engine or motor drives a blade assembly comprising a pair of reciprocating blades.

A hedge trimmer comprises a first blade and a second blade. The first and second blades typically comprises a comb-like structure wherein each tooth of the comb-like structure is a cutting element. One or both of the blades moves reciprocally past each other. This means that the reciprocating first and/or second blade continually expose and close gaps between the cutting elements. As vegetation is pressed adjacent to the first and second blades, the vegetation enters the gaps between the cutting elements. When the first and/or second blade moves, the vegetation is cut as the first blade creates a shearing action against the second blade.

U.S. Pat. No. 3,962,924 discloses a hedge trimmer which comprises first and second blades which each reciprocally move along their longitudinal axes. A problem with U.S. Pat. No. 3,962,924 is that hedge trimmer comprises blades of differing mass. The second blade, underneath the first blade is bigger and has a greater mass. This means that it takes more energy to move the second, more massive blade, through the same distance as the first, less massive blade. This is particularly noticeable when the hedge trimmer is battery driven, and the amount of energy stored in the battery is limited.

Embodiments of the present invention aim to address the aforementioned problems.

SUMMARY OF THE INVENTION

According to an aspect of the present invention there is a vegetation cutting device comprising: a housing; a motor mounted in the housing configured to drive a drive gear or wheel, at least one rotatable eccentric cam mounted on the drive gear or wheel; a reciprocating blade assembly comprising a first blade and a second blade wherein the first blade is coupled to the at least one rotatable eccentric cam and the first blade is arranged to reciprocally move when driven by the at least one rotatable eccentric cam; and a cam adjustment mechanism for varying the eccentricity of the at least one rotatable eccentric cam with respect to the drive gear or wheel and thereby varying the distance through which the first blade moves.

The eccentricity of the at least one rotatable eccentric cam can be adjusted. This means the amount of travel the cam moves in the longitudinal direction of the first blade can be adjusted. Since the cam is coupled to the first blade, this means that the distance of the first blade reciprocally moves through can be adjusted. This provides a more versatile vegetation cutting device which can be adjusted according to the conditions. For example, the user can adjust the vegetation cutting device to move the first blade by a small amount and reduce the energy drawn by the motor during operation. Conversely, the user can adjust the travel of the first blade, if for example, the user wishes cut denser vegetation, the user can make the first blade move through a large distance. When the first blade moves through a larger distance, the gaps between the first and second blades are increased and larger objects can be inserted therein.

The first blade may have a greater mass than the second blade. This means less energy is used when the first, more massive blade, is moved over a shorter distance. By only using the adjustable cam mechanism for one reciprocally moveable blade, the drive mechanism is simpler, but the vegetation cutting device can be operable in energy saving modes. In other embodiments the second blade may have a greater mass than the first blade. Alternatively the first and second blade may have an equal mass. In some embodiments the travel of the more massive blade is adjusted.

Preferably the at least one rotatable eccentric cam is a first cam which is pivotally mounted on the drive gear or wheel and the cam adjustment mechanism comprises a pinion for engaging in an internal gear in the first cam. The internal gear may be wholly enclosed within the first cam. The internal gear may be arcuate in shape. This means that when the pinion engages with the rack and turns, the first cam is urged to move in an arc. In some embodiments the first cam and the slot in the first blade are a scotch yoke arrangement. In some embodiments the first cam may be circular. In some other embodiments the first cam may be coupled to the first blade by any suitable means such as a linkage.

Preferably the second blade is reciprocally moveable and the at least one rotatable eccentric cam comprises a second rotatable eccentric cam mounted on the drive gear or wheel and the second cam is coupled with the second blade and the second blade is arranged to reciprocally move when driven by the second rotatable eccentric cam. In this way both the first and second blades are reciprocally moveable. This means that the inertial forces created by the first and second blades will be balanced.

Preferably the second cam is pivotally mounted on the drive gear or wheel and the cam adjustment mechanism comprises a pinion for engaging in an internal gear in the second cam and thereby varying the distance through which the second blade moves. In this way the travel of both the first and second blades can be adjusted.

In some embodiments the internal gear of the second cam may be wholly enclosed within the second cam. The internal gear may be arcuate in shape. This means that when the pinion engages with the rack and turns, the second cam is urged to move in an arc. In some embodiments the second cam and the slot in the second blade are a scotch yoke arrangement. In some embodiments the second cam may be circular. In some other embodiments the second cam may be coupled to the second blade by any suitable means such as a linkage.

Preferably the pinion is arranged to engage with the internal gear in the first cam and the internal gear in the second cam. Preferably the pinion is arranged to engage both the internal gear in the first cam and the internal gear in the second cam at the same time. This means any adjustment will be effected on both first and second cams and both first and second blades will be adjusted. Alternatively the cam adjustment mechanism can comprise two pinions for each independently adjusting the first and second cams.

Preferably the cam adjustment mechanism comprises a locked position in which the at least one rotatable eccentric cam cannot be adjusted and an unlocked position in which the cam adjustment mechanism can vary the eccentricity of the at least one rotatable eccentric cam. Preferably the drive gear or wheel comprises a recess for receiving and engaging the pinion and the pinion is moveable between the locked position when the pinion engages the recess and the unlocked position when the pinion is free from the recess.

Preferably the locked position the pinion is in engagement with the recess and the internal gear of the at least one rotatable eccentric cam. In this way when the pinion engages both the drive gear/wheel and the first and second cam, the cams are fixed with respect to the driver gear/wheel. This means the cams rotate about the drive gear/wheel axis when drive gear or wheel rotates.

Preferably the cam adjustment mechanism comprises user operable means for adjusting the at least one rotatable eccentric cam. Preferably the cam adjustment mechanism is biased to the locked position, this means the travel of the blades will not be varied during use.

Preferably the user operable means is arranged to move the cam adjustment mechanism from the locked position to the unlocked position and rotation of the user operable means with respect to the drive gear or wheel varies the eccentricity of the at least one rotatable eccentric cam.

Preferably the user operated means is coupled to the cam adjustment mechanism with an elongate shaft through the driver gear or wheel such that the at least one rotatable eccentric cam is on one side of the drive gear or wheel and the user operated means is on the other side of the wheel. This means that the user does not have to turn the vegetation cutting device over when adjustment of the blade stroke is required.

Preferably the vegetation cutting device is a hedge trimmer.

In another aspect of the invention there is a drive assembly for a vegetation cutting device comprising: a drive gear or wheel driveable by a motor; at least one rotatable eccentric cam mounted on the drive gear or wheel and arranged to engage with a reciprocating blade assembly and; a reciprocating blade assembly comprising a first blade and a second blade wherein the first blade comprises a slot for receiving the at least one rotatable eccentric cam and the first blade is arranged to be reciprocally moveable when driven by at least one rotatable eccentric cam; and a cam adjustment mechanism for varying the eccentricity of the at least one rotatable eccentric cam with respect to the drive gear or wheel and thereby vary the distance through which the first blade moves.

Various other aspects and further embodiments are also described in the following detailed description and in the attached claims with reference to the accompanying drawings, in which:

DETAILED DESCRIPTION OF THE INVENTION

Figure 1:
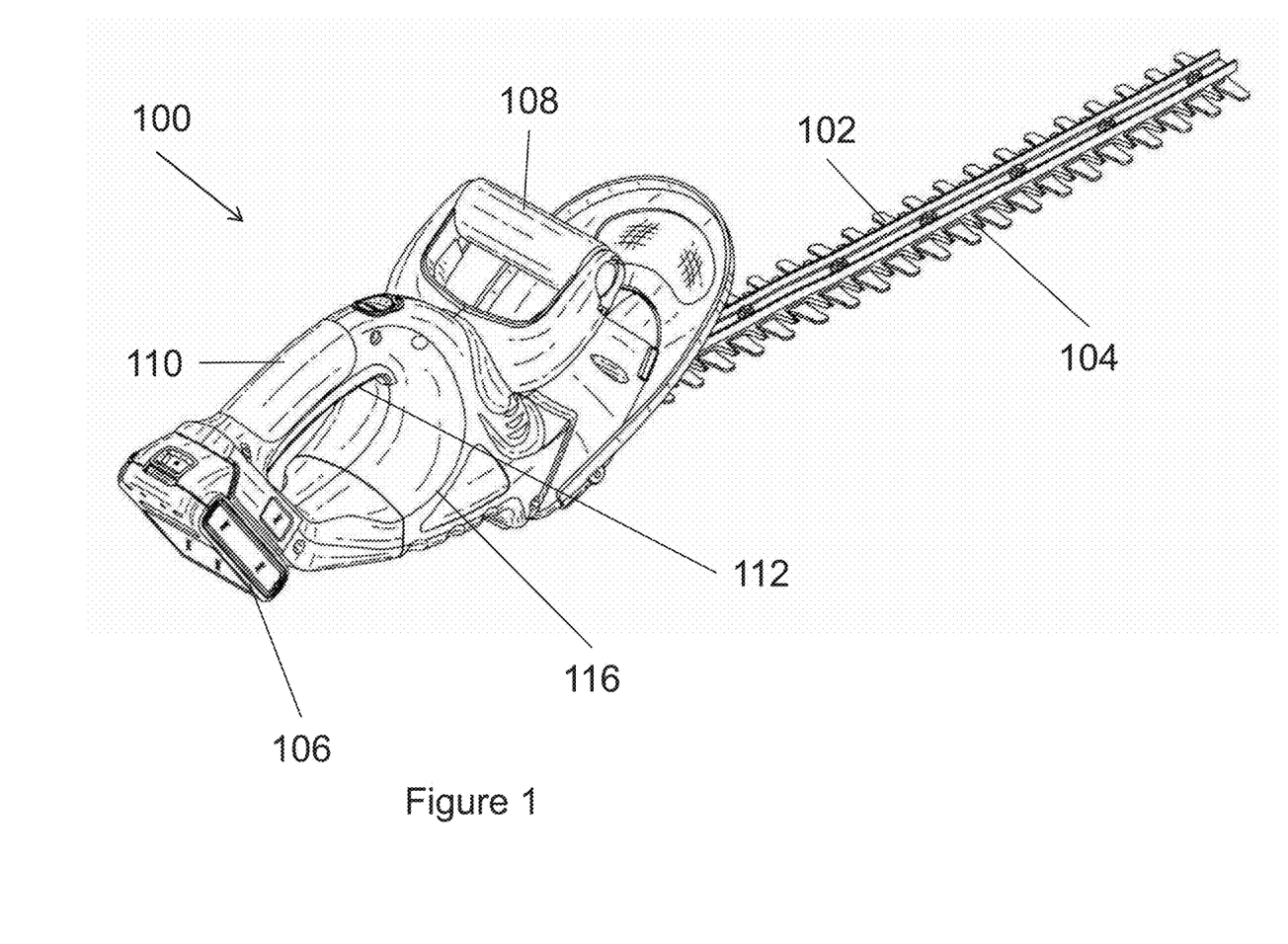
FIG. 1 shows a perspective view of the vegetation cutting device.

FIG. 1 shows a perspective view of a vegetation cutting device 100. The vegetation cutting device 100 in some embodiments is a hedge trimmer. The vegetation cutting device 100 comprises a first cutting blade 102 and a second cutting blade 104. The first and second cutting blades 102, 104 are generally elongate elements arranged to reciprocally move along their longitudinal axes. In other embodiments the vegetation cutting device 100 can be any other type of vegetation cutting device with reciprocating cutting blades, such as a shrubber or saw. For the purposes of this application the term hedge trimmer will be used hereinafter, but the invention is applicable to any vegetation cutting device comprising reciprocating blades.

The hedge trimmer 100 is cordless and comprises a battery 106. The battery 106 is removeable and can be charged in a separate charging station (not shown). In some other embodiments the hedge trimmer may be corded (not shown) and powered by an alternating current (AC) electric supply. The hedge trimmer 100 comprises a front handle 108 and a rear handle 110 allowing the user to operate the hedge trimmer 100 with two hands.

Figure 2:
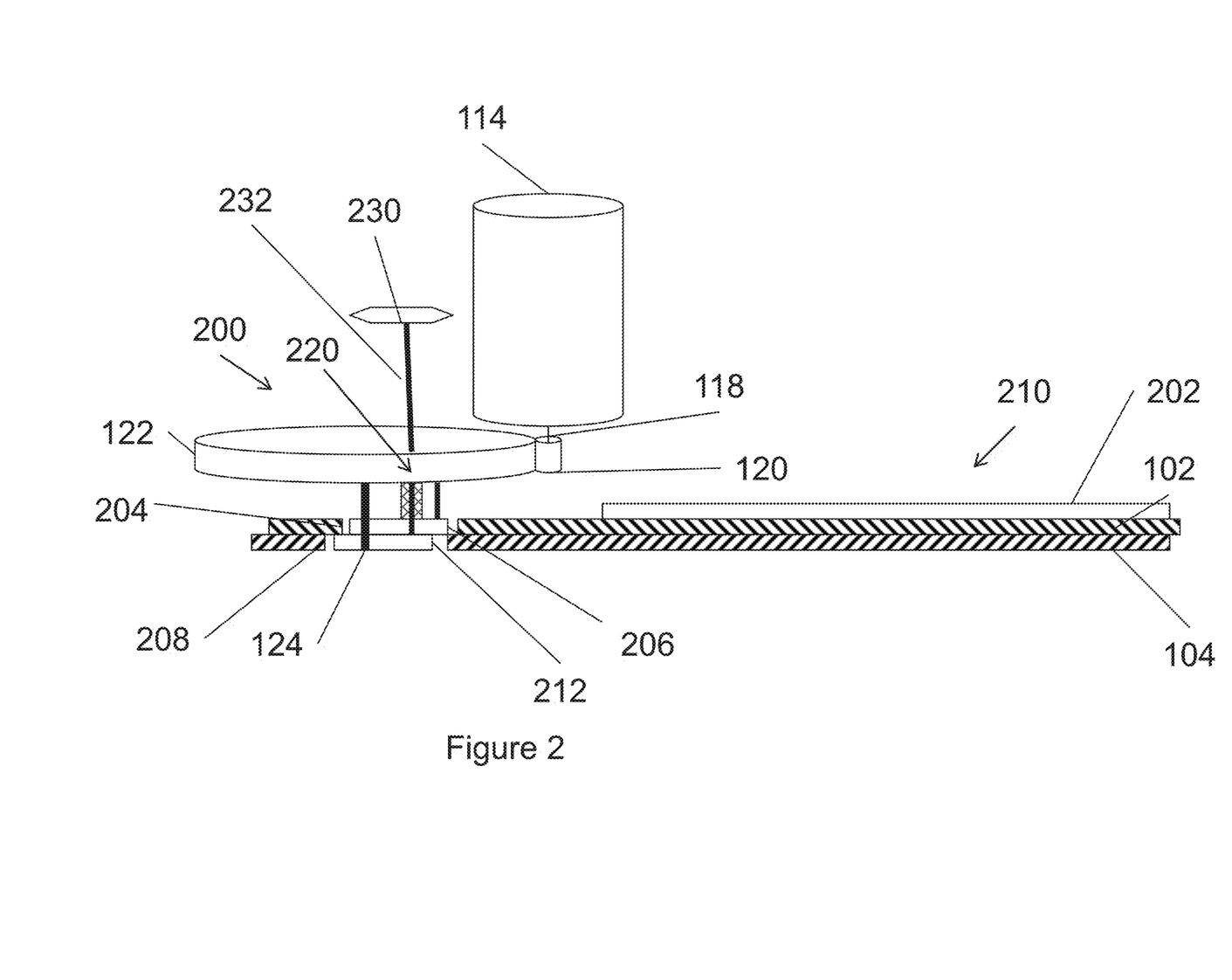
FIG. 2 shows a schematic side view of the vegetation cutting device.

The hedge trimmer 100 comprises a user operated trigger 112 for actuating the motor 114 as shown in FIG. 2. The motor 114 is mounted in a housing 116 of the hedge trimmer 100.

Turning to FIG. 2, the reciprocating first and second blades will be discussed in more detail. FIG. 2 shows a schematic representation of a drive assembly 200 of the hedge trimmer 100. The motor 114 comprises a motor shaft 118 on which a drive pinion 120 engages with a driver gear 122. The teeth of the gearing has not been shown for the purposes of clarity. The drive gear 122 is mounted on a drive shaft 124 and rotates about the longitudinal axis of the drive shaft 124.

In some embodiments the gearing is replaced with a belt drive mechanism wherein a belt (not shown) coupled the motor shaft 118 of the motor with the drive shaft 124.

The drive assembly 200 is coupled to a blade assembly 210. The blade assembly comprises the first blade 102 and a second blade 104. The first and second blades 102, 104 are mounted on a blade support 202 which fastens the blade assembly 210 to the housing 116. The first and/or second blades 102, 104 are arranged to reciprocally move with respect to each other and the blade support 202. In some embodiments the first blade 102 is reciprocally moveable and the second blade 104 is fixed with respect to the blade support 202 and the housing 116. Alternatively in other embodiments the second blade 104 is reciprocally moveable and the first blade 102 is fixed with respect to the housing 116 and the blade support 202.

In some embodiments there may be a flywheel 500 (not shown in FIG. 2, but shown in FIG. 5a) in addition to the drive gear 122. The flywheel 500 can be coupled to the blade assembly 210 to maintain the inertia of the blades 102, 104 when they cut heavy vegetation.

FIG. 2 shows an arrangement whereby both the first blade 102 and the second blade 104 are reciprocally moveable. Each blade 102, 104 is driven by the drive assembly 200. The drive assembly 200 is coupled to the blade assembly 210 by a cam. The drive assembly 200 can be coupled to the blade assembly by any suitable means. In some embodiments the cam is coupled to the blade assembly 210 by linkages (not shown). In some other embodiments the drive assembly 200 is coupled to the blade assembly 210 by a cam and slot arrangement which will now be discussed in further detail in reference to FIG. 2.

The first blade 102 comprises a first slot 204. A first cam 206 is located within the slot 204 to form a Scotch yoke arrangement. The second blade 104 comprises a second slot 208. A second cam 212 is located within the second slot 212 to form another Scotch yoke arrangement. In the embodiment where there is only one moveable blade, only one cam and slot arrangement is necessary.

The first and second cams 206, 212 are coupled to the drive gear 122 such that when the drive gear 122 rotates about the drive shaft 124, so do the first and second cams 206, 212. The first and second cams 206, 212 are mounted eccentrically from the drive shaft 124. In some embodiments the first and second cams 206, 212 are circular. In other embodiments the first and second cams 206, 212 are elliptical and may be mounted concentrically with the drive shaft 124. In some other embodiments, as will be discussed hereinafter, the first and second cams 206, 212 can be coupled to the flywheel instead of the drive gear 122.

The hedge trimmer 100 comprises a cam adjustment mechanism 220. The cam adjustment mechanism 220 is arranged to vary the eccentricity of the first cam 206 with respect to the drive gear 122. In some embodiments the cam adjustment mechanism 220 is operated with a user operated knob 230. The user operated knob 230 is coupled to the cam adjustment mechanism 220. The structure of the user operated knob 230 will be described in more detail below. The embodiment as shown in FIG. 2 shows a cam adjustment mechanism 220 for coupling and adjusting only the first cam 206. Other embodiments are discussed hereinafter wherein the cam adjustment mechanism 220 can adjust the first and second cams 206, 212. The cam adjustment mechanism 220 can be any means for adjusting the eccentricity of the first cam 206.

In some embodiments the first blade 102 comprises a greater mass than the second blade 104. This means that when the stroke or the "throw" of the heavier first blade 102 is reduced, greater energy savings are made because the heavier blade only has to travel a shorter distance. In some other embodiments the first blade 102 has a smaller mass than the second blade 104. In yet other embodiments the first blade 102 has the same mass as the second blade 104.

Figure 3:
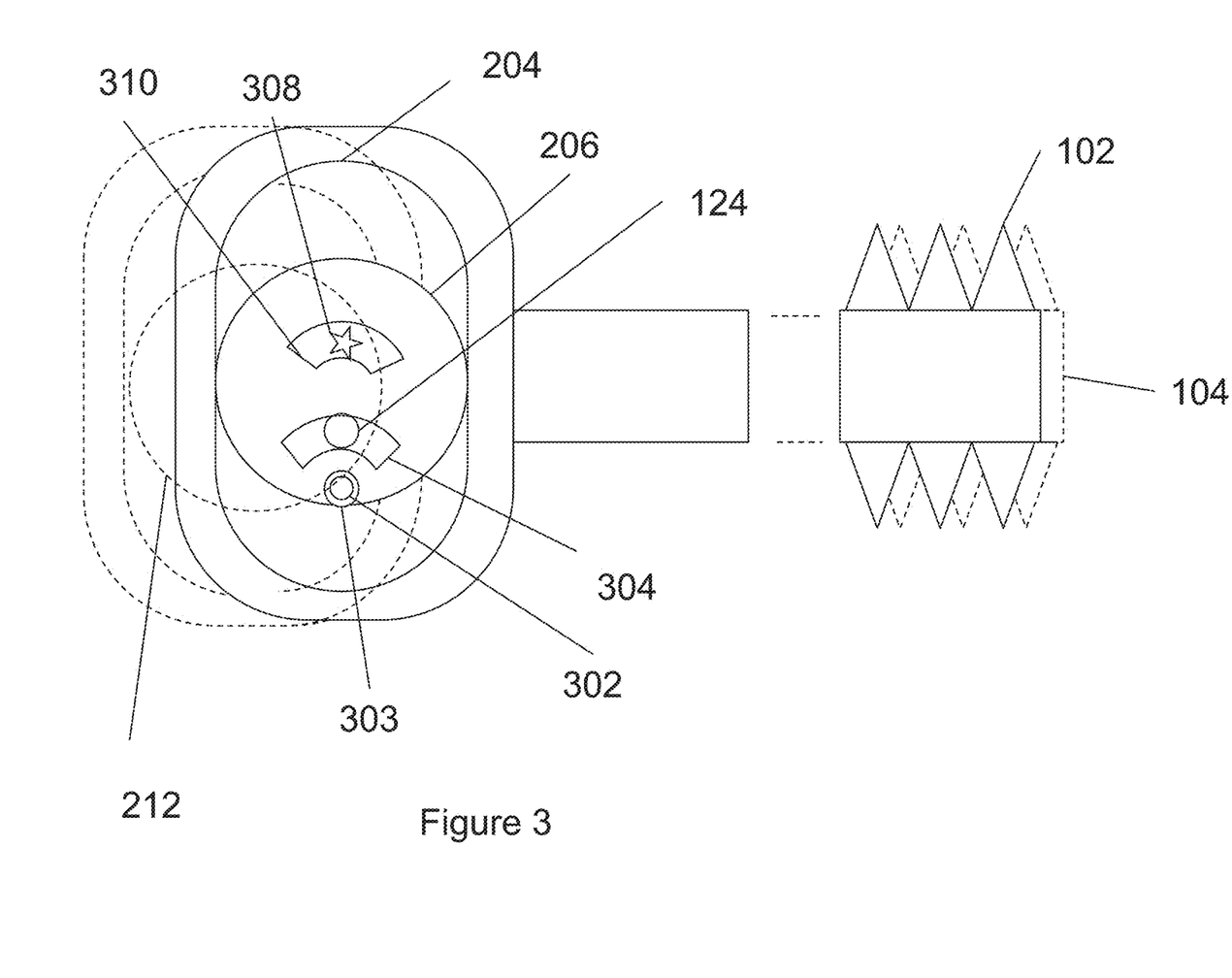
FIG. 3 shows a schematic plan view of the vegetation cutting device.

Referring to FIG. 3, the first cam 206 is mounted on the drive gear 122 on a pivot peg 302 as shown in FIG. 3. FIG. 3 shows a schematic plan view of the drive assembly 200 coupling with the blade assembly 210. FIG. 3 shows the blade assembly 210 from above and the drive gear 122 is omitted for the purposes for clarity. The second blade 104, second slot 208 and the second cam 212 are partially represented by dotted lines to indicate that they are below the first blade 102 and first cam 206 as view in FIG. 3.

The pivot peg 302 is integral with the drive gear 122 and a reciprocal hole 303 in the first cam 206 receives the pivot peg 302. The first cam 206 is arranged to pivot about the axis of the pivot peg 302.

The drive shaft 124 passes through the first cam 206 in drive shaft slot 304. Drive shaft slot 304 means that the drive shaft does not prevent the first cam 206 from pivoting. The second cam 212 is fixed with respect to the drive gear 122 on the drive shaft 124. In some embodiments the second cam 212 can be fixed to the drive gear 122 in a plurality of locations, for example the drive shaft 124 and the pivot peg 302.

The cam adjustment mechanism 220 comprises a pinion 308 mounted within a first arcuate internal gear 310. The pinion 308 is mounted on a pinion shaft 232 (as shown in FIG. 2). The pinion shaft 232 couples the pinion 308 to a user operated knob 230. The user operated knob may be mounted on the exterior of the housing 116. The user operated knob 230 may be any means to allow the user to manually rotate the pinion 308. In some other embodiments the pinion shaft 308 is coupled to a mechanism for rotating the pinion shaft 232.

For the purposes of clarity the teeth of the first arcuate internal gear 310 are not shown. In this way as the pinion 308 is rotated clockwise or anticlockwise, the first cam 206 will pivot about the pivot peg 302 and move left or right respectively. For example as the pinion 308 is rotated anticlockwise the first cam 206 will move away from the second cam 212. This increases the eccentricity of the first cam 206 and the longitudinal movement of the first blade 102 will be increased.

Figure 11:
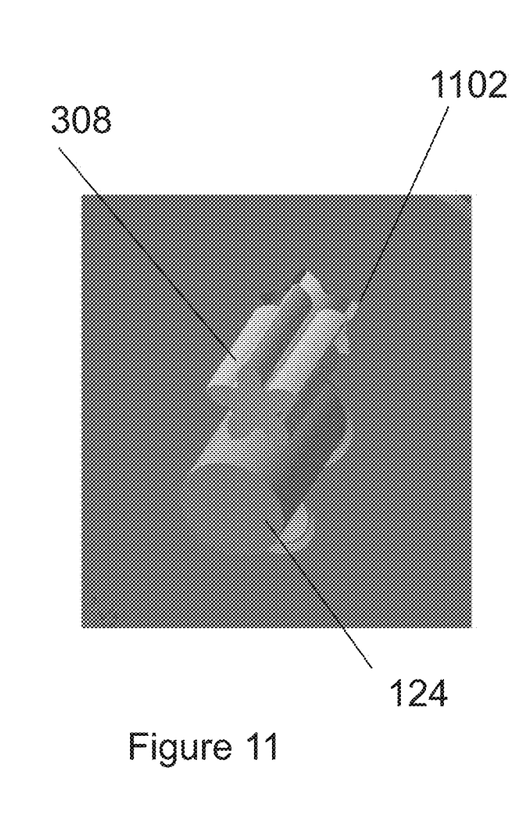
FIG. 11 shows a perspective view of the cam adjustment mechanism.

The cam adjustment mechanism 220 is moveable between a locked position and an unlocked position. In the unlocked position the eccentricity of the first cam 206 can be adjusted and in the locked position the first cam 206 is fixed with respect to the drive gear 122. The pinion 308 is moveable axially along the pinion shaft 232. In the locked position the pinion 308 is received in a reciprocally shaped recess 1102 as illustrated in FIG. 11. The recess 1102 in FIG. 11 is shown in a flywheel 500, but in the embodiment as described in reference to FIGS. 2 and 3, the recess 1102 is comprised in the drive gear 122. At the same time as the pinion engages the recess 1102, the pinion 308 also engages the first internal gear 310 of the first cam 206. This means the pinion 308 cannot rotate whilst being engaged in the recess 1102 and the first cam 206 is fixed with respect to the drive gear 122.

In order to move cam adjustment mechanism 220 into the unlocked position, the pinion 308 is moved axially along the pinion shaft 232 such that the pinion 308 is free of the recess 1102. The pinion 308 only engages the first cam 206 and only moves axially sufficient to engage the internal gear 310 of the first cam and be free of the recess 1102. The pinion 308 does not engage the second cam 212 when it moves axially. When the driver gear 122 rotates the cam adjustment mechanism 220 is in the locked position. In some embodiments the pinion 308 is biased into the recess 1102 such that the pinion is biased into the locked position. This means that the stroke of the first and/or second blades 102, 104 will not be varied during operation.

The first and second cams 206, 212 are out of synchronisation so that there is at least one point for each revolution of the drive gear 122 whereby the first and second blades 102, 104 are moving in opposite directions. In some embodiments the first and second blades 102, 104 are 180 degrees out of phase. In other embodiments the first and second blades 102, 104 are out of phase by any amount.

The operation of the vegetation cutting device 100 will now be briefly described. When the user wishes to adjust the stroke length of the first blade 102, the user manually adjusts the cam adjustment mechanism 220 using the knob 230. The user pushes the knob 230 down, freeing the pinion 308 from the recess 1102 and rotates the knob 230. This rotates the pinion 308 and the pinion 308 engages with the first internal gear 310, pivoting the first cam 206 about the pivot peg 302. This adjusts the eccentricity of the first cam 206 with respect to the drive gear 122. In other words rotation of the pinion 308 changes the distance of the position the first cam 206 is from the drive shaft 124. Consequently the distance the first cam 206 moves in the longitudinal direction of the first blade 102 will have changed. This means that the stroke length of the first blade 102 will be adjusted. Once the user is happy with the stroke length adjustment, the user lets the pinion 308 return to the recess 1102, returning the cam adjustment mechanism 220 to the locked position.

Figure 4:
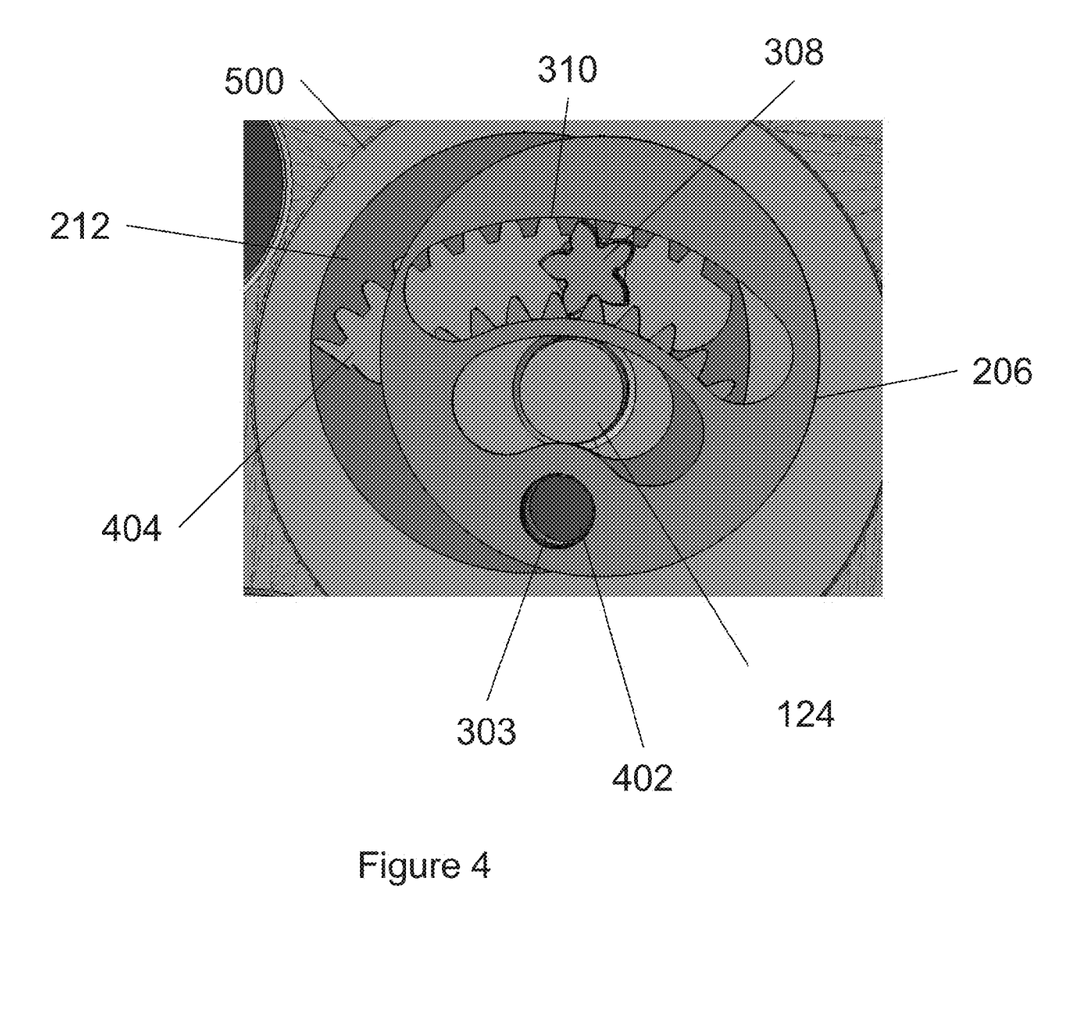
FIG. 4 shows an underneath plan view of the cam adjustment mechanism.

Another embodiment will now be discussed in reference to FIG. 4. FIG. 4 shows an underneath plan view of the first and second cams 206, 212 whereby the cam adjustment mechanism 220 can adjust the eccentricity of the both the first and second cams 206, 212. The first cam 206 is the same as discussed in previous embodiments.

The first and second cams 206, 212 are mounted on a flywheel 500. The flywheel 500 is coupled to the drive gear 122 (not shown) and is mounted on the drive shaft 124. The embodiments discussed in reference to FIG. 4 onwards describe used of a flywheel 500, however the flywheel 500 is an optional feature. The first and second cams 206, 212 are alternatively mounted on the drive gear 122 as discussed in reference to previous embodiments.

Both the first and second cams 206, 212 are pivotally mounted on the pivot peg 402. The pivot peg 402, similar to the embodiment discussed in reference to FIGS. 2 and 3 is integral with the flywheel 500. Both the first and second cams 206, 212 comprise a reciprocal pivot hole 303 which is mounted on the pivot peg 402.

The second cam 212 also comprises a second internal gear 404. The second internal gear 404 is the same as the first internal gear 310 except that the teeth are on the opposite side of the pinion 308 to the teeth of the first internal gear 310. This means that when the pinion 308 rotates, the first cam 206 pivots in one direction and the second cam 212 pivots in the other direction and thus shortening or lengthening the stroke. In some embodiments, the first and second internal gears 310, 404 are the same length and trace the same curve (e.g. have the same radius of curvature). This means that when the pinion 308 rotates, the first and second cams 206, 212 pivot by the same amount either side of the drive shaft 124. This helps balance the first and second cams 206, 212 when the drive gear 122 rotates.

In an alternative embodiment, the first and second cams 206, 212 pivot at different rates. Additional gearing or an alternative tooth rack arrangement may be provided to make the first and second cams 206, 212 pivot at different rates when the pinion 308 rotates. In one embodiment the first cam 206 pivots a greater amount to the second cam 212 when the cam adjustment mechanism is actuated. The first cam 206 is coupled to a heavier first blade 102 and the second cam is coupled to a lighter second blade. This means than the stroke length of the first blade can be changed at a greater rate and amount than the second blade. This means that an energy saving can be achieved by reducing the stroke length of the first blade 102 without reducing the overall stroke length of the second blade 104.

Figure 5A:
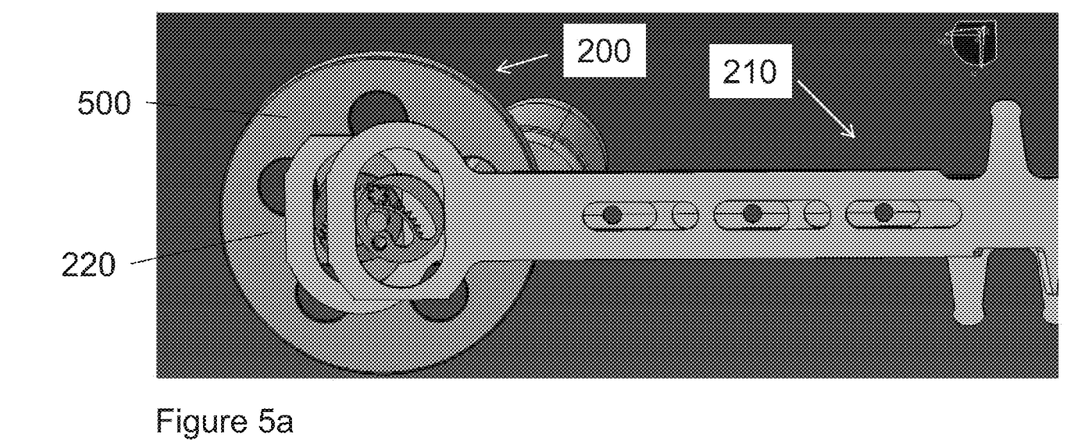
FIGS. 5a and 5b show an underneath plan view of the vegetation cutting device.
Figure 5B:
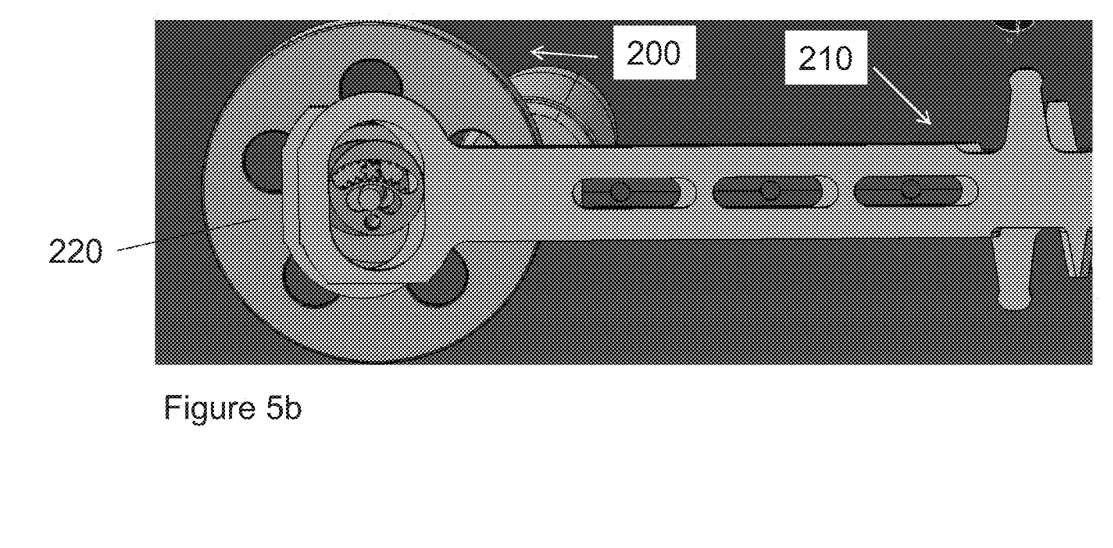

Reference will now be made to FIGS. 5a and 5b which show the cam adjustment mechanism 220 in use with drive assembly 200 and the blade assembly 210. FIG. 5a shows the pinion 308 having travelled to its maximum extent within the first and second internal gears 310, 404. This means the first and second cams 206, 212 have their maximum eccentricity and the first and second blades 102, 104 will travel through their maximum displacement.

FIG. 5b shows the pinion 308 at or close to an initial position. In this position the pinion 308 and the first and second cams 206, 212 are arranged to have a minimum eccentricity. In some embodiments the pinion 308 will not rotate so that the first and second cams 206, 212 are in line, because otherwise the first and second blades 206, 212 will be in synchronisation and there will be no relative shearing motion between the blades. A stop member may be provided to prevent the pinion 308 from bringing the first and second cams 206, 212 any closer than shown in FIG. 5b.

Figure 6A:
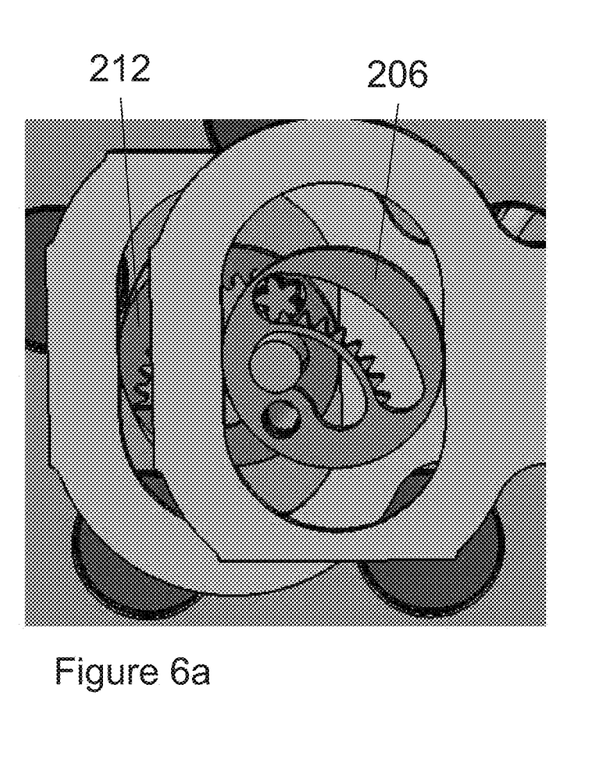
FIGS. 6a and 6b show an underneath plan view of the cam adjustment mechanism.
Figure 6B:
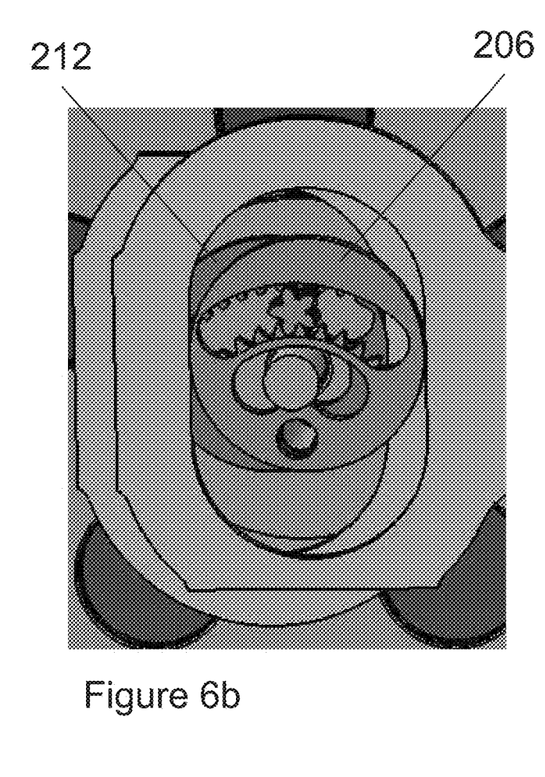
Figure 7:
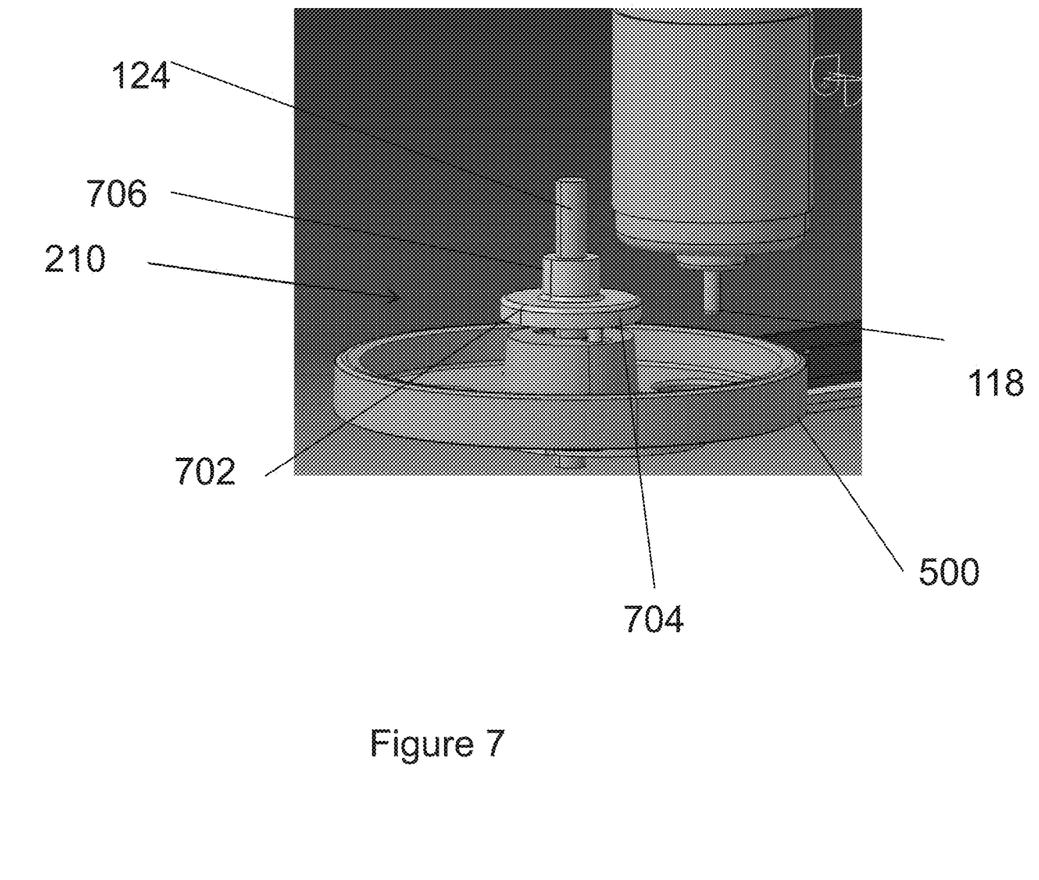
FIGS. 7, 8, 9 and 10 show perspective exploded views of the vegetation cutting device.

FIGS. 6a and 6b show a detailed close of underneath plan view of the first and second cams 206, 212 as shown in FIGS. 5a and 5b.

The cam adjustment mechanism 220 will now be discussed in further detail with respect to FIGS. 7, 8, 9 and 10. FIGS. 7, 8, 9, and 10 show a perspective exploded view of the drive assembly and the blade assembly. For the purposes of clarity, the drive gear and the drive pinion have not been shown. They would, of course, be mounted on the motor shaft 118 and the drive shaft 124 respectively.

The cam adjustment mechanism 220 is the same as discussed in reference to the previous embodiments as shown in FIGS. 4, 5a and 5b. In addition the cam adjustment mechanism 220 comprises an adjustment element 702 mounted on the drive shaft 124. The adjustment element 702 comprises a "top hat" shape having a cylindrical body 704 and a circular flange 706. The adjustment element 702 is arranged to move axially on the drive shaft 124 to engage the flywheel 500. The adjustment element 702 may be coupled to the user actuated knob 230. When the adjustment element 702 is depressed downwardly on the drive shaft 124, the adjustment element 702 engages the flywheel 500.

Figure 8:
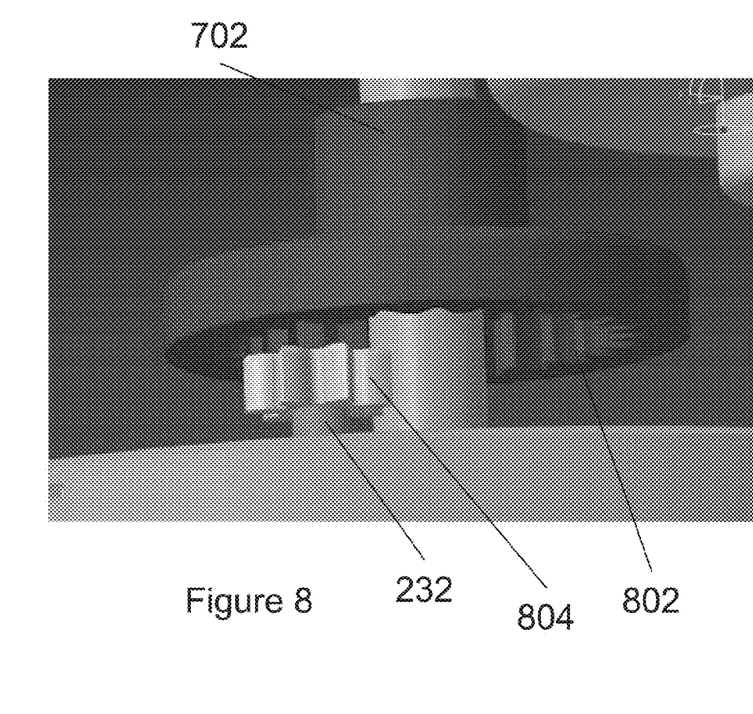
Figure 9:
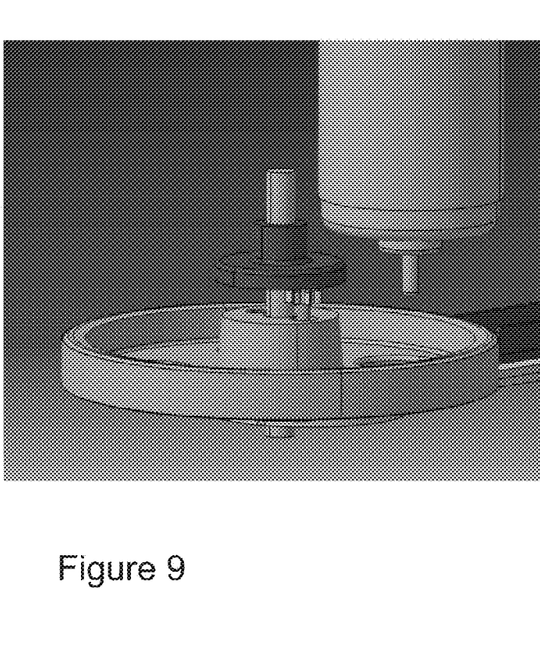

Turning to FIG. 8, which shows the adjustment element 702 from a different perspective, the underside of the flange comprises a ring gear 802. The ring gear 802 is arranged to engage with an upper planetary gear 804 mounted on the pinion shaft 232. FIGS. 8 and 9 show the adjustment element 702 biased away from the flywheel. The upper planetary gear 804 is also biased away from the flywheel 500. In this position, the pinion 308 is engaged with the recess 1102 and the pinion 308, pinion shaft 232 and the upper planetary gear 804 are fixed with respect to the flywheel 500.

Figure 10:
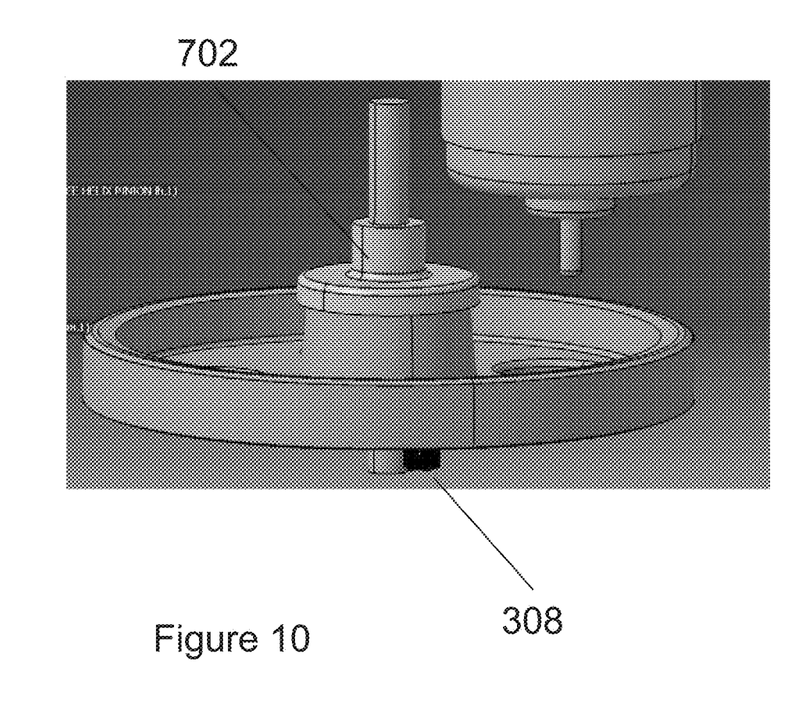

Turning to FIG. 10, which does not show the blade assembly for clarity, operation of the cam adjustment mechanism will now be discussed. The adjustment element 702 is depressed, such that the ring gear 802 engages with the upper planetary gear 804 and until the pinion 308 is pushed free of the recess 1102 (as shown in FIG. 11). The adjustment mechanism 702 can then be rotated which causes the pinion 308 to rotate and move the first 206 and second 212 cams.

Figure 12:
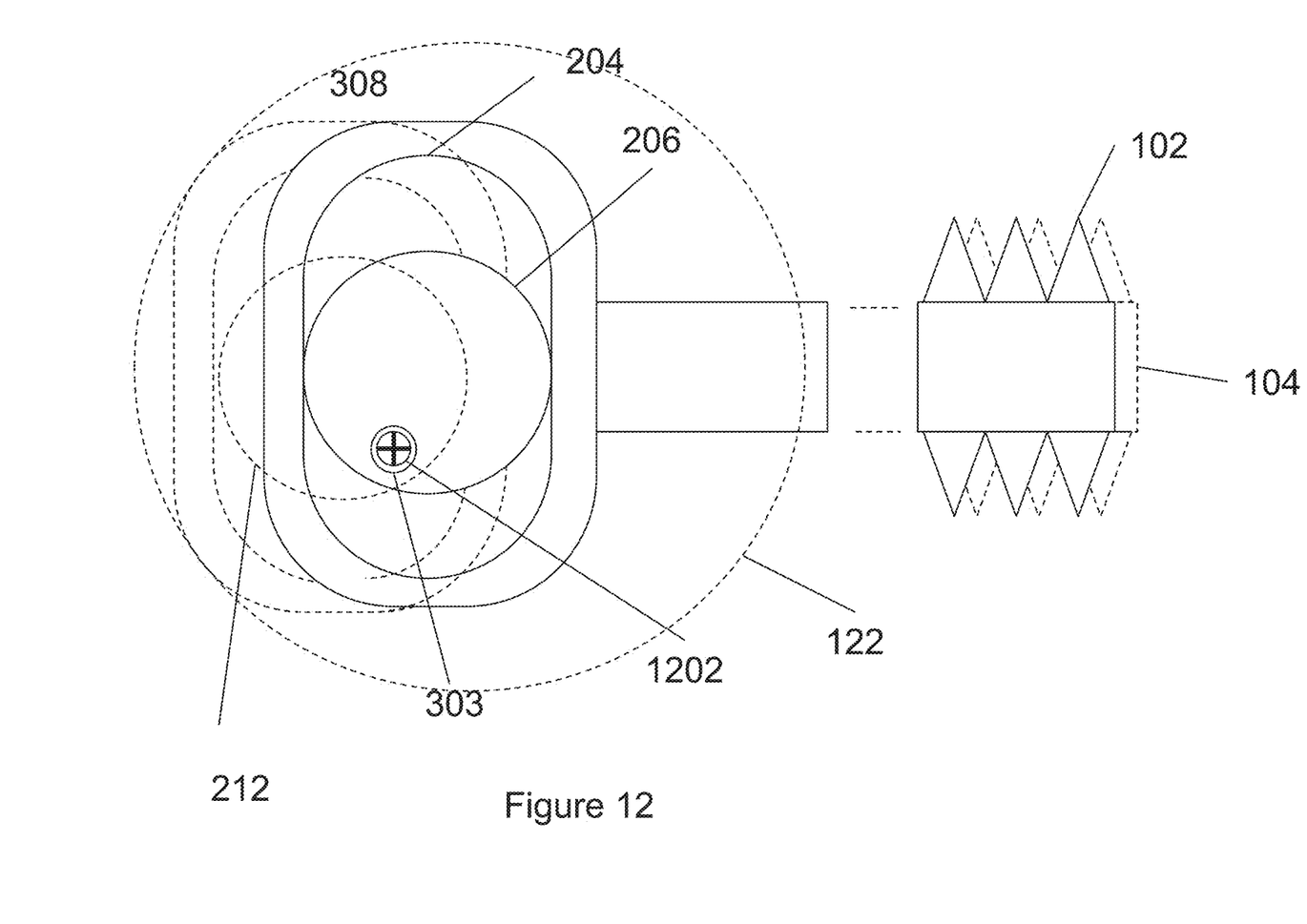
FIG. 12 shows an underneath schematic plan view of the vegetation cutting device.

Another embodiment is shown in FIG. 12. FIG. 12 shows a schematic underneath plan view of the blade assembly 210 and the drive assembly 200 which are the same as previous embodiments except that the cam adjustment mechanism 220 has been modified. The drive gear 122 is shown in FIG. 12 and is located underneath the first and second cams 206, 212. The first and second cams 206, 212 are fixed to the drive gear 122 with a fastener 1202. The fastener 1202 is mounted within though the pivot hole 303 in the first and second cams 206, 212 and couples to the drive gear 122. The first and second cams 206, 212 are arranged to pivot about the fastener 1202. The fastener 1202 may be a screw fastener which threadedly engages with a threaded hole in the drive gear 122. The eccentricity of the first and second cam 206, 212 is achieved by unscrewing the fastener 1202, adjusting the first and/or second cams 206, 212 and then tightening the fastener 1202. The embodiment shown in FIG. 12 provides a simple alternative whereby the eccentricity can be manually adjustable with a screwdriver.

In another embodiment two or more embodiments are combined. Features of one embodiment can be combined with features of other embodiments.

Embodiments of the present invention have been discussed with particular reference to the examples illustrated. However it will be appreciated that variations and modifications may be made to the examples described within the scope of the invention.

The invention claimed is:

1. A vegetation cutting device comprising:
   a housing;
   a drive gear;
   a motor mounted in the housing configured to drive the drive gear,
   a rotatable eccentric first cam mounted on the drive gear;
   a blade assembly comprising a first blade and a second blade wherein the first blade is coupled to the the first cam and the first blade is arranged to reciprocally move when driven by the first cam; and
   a cam adjustment mechanism operatively connected to the first cam for varying an eccentricity of the first cam with respect to the drive gear and thereby varying a distance through which the first blade moves.

2. The vegetation cutting device according to claim 1 wherein the first cam is pivotally mounted on the drive gear and the cam adjustment mechanism comprises a pinion for engaging in an internal gear in the first cam defining the operative connection.

3. The vegetation cutting device according to claim 2 wherein the second blade is reciprocally moveable and further including a rotatable eccentric second cam mounted on the drive gear and the second cam is coupled to the second blade and the second blade is arranged to reciprocally move when driven by the second cam.

4. The vegetation cutting device according to claim 3 wherein the second cam is pivotally mounted on the drive gear and the pinion of the cam adjustment mechanism engages in an internal gear in the second cam and thereby varies a distance through which the second blade moves.

5. The vegetation cutting device according to claim 4 wherein the pinion is arranged to engage with the internal gear in the first cam and the internal gear in the second cam.

6. The vegetation cutting device according to claim 2 wherein the pinion of the cam adjustment mechanism comprises a locked position in which it cannot adjust the eccentricity of the first cam and an unlocked position in which it can adjust the eccentricity of the first cam.

7. The vegetation cutting device according to claim 6 wherein the drive gear comprises a recess for receiving and engaging the pinion and the pinion is moveable between the locked position when the pinion engages the recess and the unlocked position when the pinion is free from the recess.

8. The vegetation cutting device according to claim 7 wherein in the locked position the pinion is in engagement with the recess and an internal gear of the first cam.

9. The vegetation cutting device according to claim 8 wherein the cam adjustment mechanism comprises a user operable means for adjusting the eccentricity of the first cam.

10. The vegetation cutting device according to claim 9 wherein the user operable means is arranged to move the pinion of the cam adjustment mechanism from the locked position to the unlocked position and rotation of the user operable means with respect to the drive gear varies the eccentricity of the first cam.

11. The vegetation cutting device according to claim 10 wherein the vegetation cutting device is a hedge trimmer.

12. A drive assembly for a vegetation cutting device comprising:
    a motor;
    a drive gear driveable by the motor;
    a rotatable eccentric cam mounted on the drive gear;
    a reciprocating blade assembly comprising a first blade and a second blade wherein the first blade is coupled to the cam and the first blade is arranged to reciprocally move when driven by the cam; and
    a cam adjustment mechanism operatively connected to the cam for varying an eccentricity of the cam with respect to the drive gear and thereby vary a distance through which the first blade moves.

13. A vegetation cutting device comprising:
    a housing;
    a drive gear;
    a motor mounted in the housing configured to drive a drive gear,
    a rotatable eccentric cam mounted on the drive gear;
    a reciprocating blade assembly comprising a first blade and a second blade wherein the first blade is coupled to the eccentric cam and the first blade is arranged to reciprocally move when driven by the eccentric cam; and
    a cam adjustment mechanism having a pinion coupled to the eccentric cam for moving the eccentric cam relative to the first blade to vary a distance through which the first blade moves.

14. The vegetation cutting device of claim 13, wherein the pinion is coupled to an internal gear within the eccentric cam, and the eccentric cam pivots about a non-centrally located pivot peg that defines the mounting between the eccentric cam and the drive gear.

* * * * *